(12) United States Patent
Li et al.

(10) Patent No.: US 11,920,844 B2
(45) Date of Patent: Mar. 5, 2024

(54) AIR DISTRIBUTION MECHANISM AND CRYOGENIC REFRIGERATOR USING SAME

(71) Applicant: CSIC Pride (Nanjing) Cryogenic Technology Co., Ltd., Jiangsu (CN)

(72) Inventors: Ao Li, Jiangsu (CN); Jinhong Ge, Jiangsu (CN); Zhipo Zhou, Jiangsu (CN); Chenxi Xia, Jiangsu (CN)

(73) Assignee: CSIC PRIDE (NANJING) CRYOGENIC TECHNOLOGY CO., LTD., Nanjing (CN)

( * ) Notice: Subject to any disclaimer, the term of this patent is extended or adjusted under 35 U.S.C. 154(b) by 394 days.

(21) Appl. No.: 17/048,956

(22) PCT Filed: May 16, 2018

(86) PCT No.: PCT/CN2018/087131
§ 371 (c)(1),
(2) Date: Oct. 19, 2020

(87) PCT Pub. No.: WO2019/200644
PCT Pub. Date: Oct. 24, 2019

(65) Prior Publication Data
US 2021/0148610 A1 May 20, 2021

(30) Foreign Application Priority Data
Apr. 19, 2018 (CN) .......................... 201810355674.1

(51) Int. Cl.
*F25B 9/14* (2006.01)
*F25B 41/20* (2021.01)

(52) U.S. Cl.
CPC ................ *F25B 9/14* (2013.01); *F25B 41/20* (2021.01); *F25B 2309/006* (2013.01); *F25B 2500/05* (2013.01)

(58) Field of Classification Search
CPC ...... F25B 9/14; F25B 41/20; F25B 2309/006; F25B 2500/05
See application file for complete search history.

(56) References Cited

FOREIGN PATENT DOCUMENTS

| CN | 102844634 | 12/2012 |
|---|---|---|
| CN | 103968591 | 8/2014 |

(Continued)

OTHER PUBLICATIONS

Hirose, Rotary valve and freezer therewith, 2001, Full Document (Year: 2001).*

(Continued)

*Primary Examiner* — Nael N Babaa
(74) *Attorney, Agent, or Firm* — Gary J. Gershik (57) ABSTRACT

An air distribution mechanism and a corresponding cryogenic refrigerator are provided. The air distribution mechanism includes an air distribution valve (6) and a rotary valve (7), the air distribution valve (6) includes an air distribution valve main body (6a) and an air distribution valve seat (6b), an air distribution plane (6a3) that is on the air distribution valve main body (6a) and faces away from the air distribution valve seat (6b) protrudes relative to the air distribution valve seat (6b), the air distribution plane (6a3) is tightly attached to a switching plane (73) on the rotary valve (7), and the switching plane (73) protrudes from the rotary valve (7); the air distribution valve (6) is fixedly mounted in a mounting chamber of a cover (2), and the rotary valve (7) is rotatable around a principal rotation axis O of the rotary valve relative to the air distribution valve (6) to switch connection states of an air distribution side flow path and a switching side flow path. The cryogenic refrigerator includes the air distribution mechanism. The air distribution mechanism can avoid performing surface treatment on the (Continued)

rotary valve 7 to reduce costs, and only the rotary valve 7 is a moving component, to ensure the device stability.

20 Claims, 6 Drawing Sheets

(56) References Cited

FOREIGN PATENT DOCUMENTS

| | | | |
|---|---|---|---|
| CN | 208139619 | | 11/2018 |
| JP | 2001-349630 | | 12/2001 |
| JP | 2001349630 A | * | 12/2001 |
| KR | 101498348 B1 | * | 4/2011 |

OTHER PUBLICATIONS

Takahiro, Rotary valve and cryogenic refrigerator using same, 2011, Full Document (Year: 2011).*

* cited by examiner

AIR DISTRIBUTION MECHANISM AND CRYOGENIC REFRIGERATOR USING SAME

CROSS-REFERENCE TO RELATED APPLICATIONS

This application is a § 371 national stage of PCT International Application No. PCT/CN2018/087131, filed May 16, 2018, claiming priority of Chinese Patent Application No. 201810355674.1, filed Apr. 19, 2018, the contents of each of which are hereby incorporated by reference herein.

BACKGROUND

Technical Field

The present invention relates to the field of cryogenic refrigerator technologies, and specifically to an air distribution mechanism that performs flow path switching by rotating a rotary valve and making an air distribution valve stationary, and can reduce costs and ensure the device stability, and a cryogenic refrigerator using the air distribution mechanism.

Related Art

Figure 1:
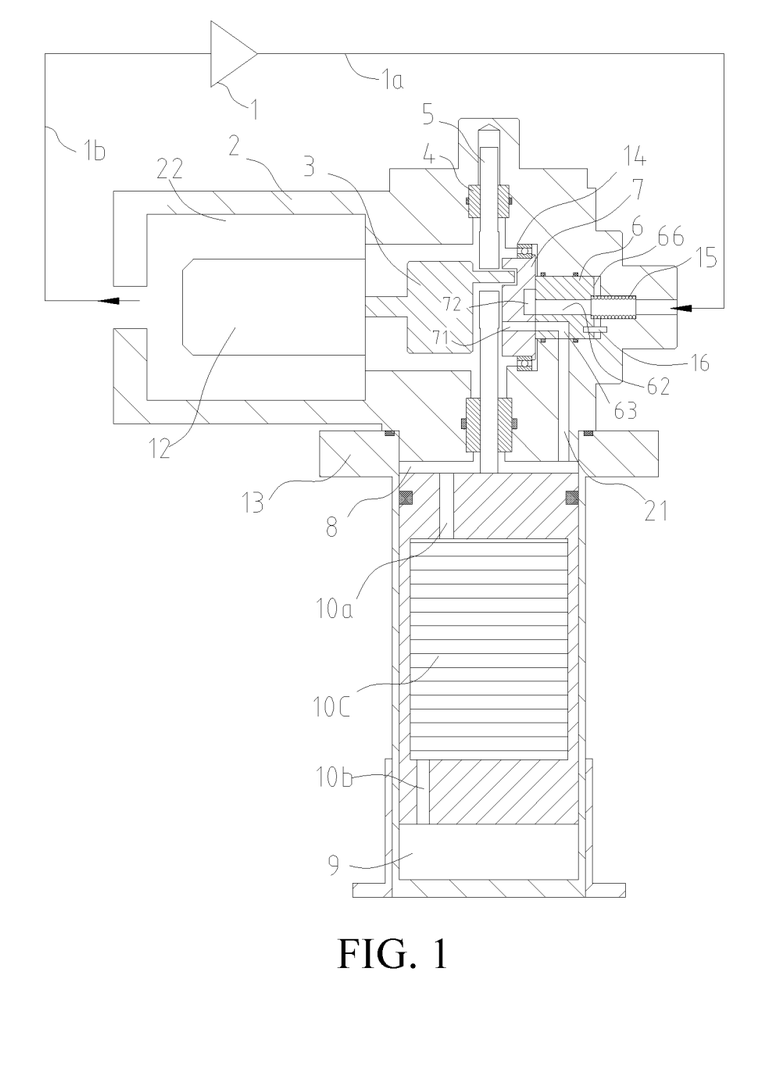
FIG. 1 is a schematic structural diagram of a cryogenic refrigerator with a conventional air distribution mechanism.

An ultra-low temperature refrigerator represented by a Gifford-McMahon (GM) refrigerator has an expander and a compressor for working gas (which is further referred to as refrigerant gas). FIG. 1 shows such a refrigerator. A high-pressure airflow provided and discharged by a compressor 1 enters, through an air distribution mechanism RV (an air distribution valve 6 and a rotary valve 7), a pushing piston that is disposed in a cylinder 13 and reciprocates up and down, exchanges heat with a cold storage material 10c, then does work and expands in an expansion chamber 9, then flows out of the air distribution mechanism through the pushing piston, and returns to a low-pressure chamber of the compressor 1. A refrigeration effect is formed through the foregoing continuous cyclic process.

Specifically, such a refrigerator shown in FIG. 1 includes the compressor 1, a cover 2, the cylinder 13, and the pushing piston 10. A motor 12 and a driving cam 3 are mounted in the cover 2. An eccentric cam handle 31 on the cam 3 drives a connecting rod 5 to transform rotary motion into up-and-down alternating motion, thereby driving the pushing piston to move up and down in the cylinder 13. The air distribution mechanism RV includes the air distribution valve 6 and the rotary valve 7. The air distribution valve 6 is mounted in the cover 2, is fixed in the cover by a positioning pin 16, and is arranged coaxially with the rotary valve 7. The cam handle 31 drives the rotary valve 7 mounted on a bearing 14 to rotate around a rotation axis. The compressor 1 sucks and compresses the refrigerant gas, and discharges the refrigerant gas as a high-pressure refrigerant gas. The high-pressure refrigerant gas is supplied to the cover 2 through the high-pressure air exhaust pipe 1a, and delivered, through a high-pressure air hole 62 on the air distribution valve 6, to a high-pressure groove 72 on the rotary valve 7 having an airtight attachment to the air distribution valve. The high-pressure groove 72 is not in communication with a low-pressure hole 71. The rotary valve 7 is provided with the low-pressure hole 71, and the low-pressure hole 71 is in communication with a low-pressure passage 22 in the cover 2. According to a position shown in FIG. 1, the low-pressure hole 71 overlaps with and is in communication with an air distribution valve air hole 63 on the air distribution valve 6.

In this case, the low-pressure hole 71 on the rotary valve 7, the air distribution valve air hole 63 on the air distribution valve 6, and a cover air hole 21 on the cover 2 are in communication with each other. A system is in a low-pressure air exhaust phase. The gas in the expansion chamber 9 changes from high pressure to low pressure, flows out through a piston rear hole 10b, the cold storage material 10c, and a piston front hole 10a on the pushing piston sequentially, and returns to a low-pressure suction pipe 1b of the compressor 1. After the rotary valve 7 rotates by a certain angle, a case that the low-pressure hole 71 is not in communication with the air distribution valve air hole 63 on the air distribution valve 6 becomes a case that the high-pressure groove 72 on the rotary valve 7 is in communication with the air distribution valve air hole 63 on the air distribution valve 6 (the matching relationship is not shown). In this case, a high-pressure gas discharged from the compressor 1 enters the cylinder 13 through the high-pressure air hole 62 on the air distribution valve 6, and the high-pressure groove 72 that is in communication with the high-pressure air hole and that is on the rotary valve 7, and enters the expansion chamber 9 through the piston front hole 10a, the cold storage material 10c, and the piston rear hole 10b on the pushing piston sequentially. In the foregoing process, a high-pressure gas discharged from the compressor 1 acts on a rear face 66 of the air distribution valve 6. In reliance on a positive pressure on the rear face 66 and an elastic force of a spring 15, the air distribution valve 6 is closely attached to the rotary valve 7 to form an airtight sliding contact surface. The rotary valve 7 and the air distribution valve 6 are both designed as rotating body structures along the rotation axis. The rotary valve 7 is rotatably supported in the cover 2 by the bearing 14. The air distribution valve 6 and the rotary valve 7 are coaxially arranged in the cover 2. The air distribution valve 6 is fixed by the valve body positioning pin 16 so as not to rotate, but may be mounted and dismounted in an axial direction of a principal rotation axis O.

A general air distribution mechanism uses a planar rotary valve, and includes two main components: the rotary valve 7 and the air distribution valve 6. One component is made of a wear-resistant resin material. The other one is made of a metal material. During operation, the two components are attached to each other plane to plane, and a communication state of grooves on the rotary valve 7 and the air distribution valve 6 is switched through the rotation of the rotary valve 7, to switch between high-pressure and low-pressure airflows. In the attaching process, pressing is performed through a pressure difference between two sides of the air distribution mechanism. Then, the air distribution valve 6 and the rotary valve 7 are tightly pressed against each other and are in airtight sliding contact. Generally, wear-resistant treatment is performed on a surface of the rotary valve 7. The air distribution valve 6 is made of an expensive wear-resistant resin. In a long-term use process, the air distribution mechanism needs to be replaced regularly, which is costly. There is a document proposing that an entire rotary valve is divided into a metal valve plate main body and a resin valve sliding body, and only the valve sliding body needs to be replaced. The costs problem is resolved by using such a method. However, a change from one conventional moving component to two moving components (the valve plate main body and the valve sliding body both need to rotate around the rotation axis) increases device instability.

SUMMARY

For the problems existing in the related art, an objective of the present invention is to provide an air distribution mechanism that performs flow path switching by rotating a rotary valve and making an air distribution valve stationary, and can reduce costs and ensure the device stability, and a cryogenic refrigerator using the air distribution mechanism.

The objective of the present invention is achieved through the following technical solutions.

An air distribution mechanism includes an air distribution valve including an air distribution side flow path and a rotary valve including a switching side flow path, where the air distribution valve includes an air distribution valve main body and an air distribution valve seat that are fixedly connected and that are dismountable, an air distribution plane that is on the air distribution valve main body and faces away from the air distribution valve seat protrudes relative to the air distribution valve seat, the air distribution plane is tightly attached to a switching plane on the rotary valve, and the switching plane protrudes from the rotary valve; the air distribution valve is fixedly mounted in a mounting chamber of the cover, and the rotary valve is rotatable around a principal rotation axis O of the rotary valve relative to the air distribution valve to switch connection states of the air distribution side flow path of the air distribution valve and the switching side flow path of the rotary valve.

The air distribution valve main body, the air distribution valve seat and the rotary valve are coaxially arranged in the axial direction of the principal rotation axis O and are each dismountable in the axial direction of the principal rotation axis O, and the air distribution valve including the air distribution valve main body and the air distribution valve seat is stationary relative to the cover.

A high-pressure passage and an air distribution passage running through the air distribution valve main body in the axial direction are disposed on the air distribution valve main body, and a valve seat high-pressure passage running through the air distribution valve seat in the axial direction, and a valve seat air distribution passage running through the air distribution valve seat in a folded direction are disposed on the air distribution valve seat; the high-pressure passage and the valve seat high-pressure passage are arranged in communication with each other and are capable of being in communication with a high-pressure air exhaust pipe of the compressor; and the air distribution passage and the valve seat air distribution passage are arranged in communication with each other and are capable of being in communication with an cover air hole on the cover.

The high-pressure passage and the valve seat high-pressure passage are capable of being in communication with the air distribution passage, the valve seat air distribution passage, and the cover air hole through a high-pressure groove on the rotary valve; or the valve seat air distribution passage and the air distribution passage are in communication with a low-pressure passage on the cover through a low-pressure hole running through the rotary valve.

The high-pressure passage and the valve seat high-pressure passage are kept in airtight communication by a third sealing ring that is disposed in a communication place of the high-pressure passage and the valve seat high-pressure passage and that is located on a side of the valve seat high-pressure passage; and the valve seat air distribution passage and the air distribution passage are kept in airtight communication through a combination of the third sealing ring and a fourth sealing ring.

The third sealing ring is embedded in a positive sealing groove disposed at an end of an inner chamber of the valve seat high-pressure passage.

A valve seat rear face of the air distribution valve seat is subject to a positive pressure that is of a high-pressure gas discharged from the high-pressure air exhaust pipe and that is in the axial direction of the principal rotation axis O and toward the rotary valve, so that the air distribution plane on the air distribution valve main body is tightly attached to the switching plane on the rotary valve, and further a main body rear face on the air distribution valve main body is tightly attached to a valve seat front face on the air distribution valve seat.

The air distribution valve main body and the air distribution valve seat are eccentrically and fixedly connected together by an intra-valve positioning pin, the air distribution valve main body is provided with a main body pin hole into which one end of the intra-valve positioning pin is inserted, and the air distribution valve seat is provided with a valve seat pin hole into which the other end of the intra-valve positioning pin is inserted.

The air distribution valve seat is provided with an accommodating chamber in which the air distribution valve main body is capable of being embedded, a radial length of an accommodating chamber edge of the accommodating chamber is consistent with a radial length of a main body outer diameter surface of the air distribution valve main body, and an inner wall of the accommodating chamber is provided with a lateral sealing groove in which the fourth sealing ring is disposed; and a first sealing ring and a second sealing ring embedded in an inner wall of the mounting chamber of the cover are disposed on a valve seat outer diameter surface of the air distribution valve seat, to laterally seal the air distribution valve seat.

A radial size of a main body outer diameter surface of the air distribution valve main body is consistent with a radial size of a valve seat outer diameter surface of the air distribution valve seat, the air distribution valve main body and the air distribution valve seat are both mounted in the cover, and an inner wall of an accommodating chamber of the cover is provided with a lateral sealing groove in which the fourth sealing ring is disposed;

and a first sealing ring and a second sealing ring embedded in the inner wall of the accommodating chamber of the cover are disposed on the valve seat outer diameter surface of the air distribution valve seat, to laterally seal the air distribution valve seat.

Material hardness of the air distribution valve main body is lower than material hardness of the rotary valve. For example, the air distribution valve main body is made of a resin material, and the rotary valve and the air distribution valve seat may be made of stainless steel or other metal materials.

A cryogenic refrigerator using an air distribution mechanism is provided. The cryogenic refrigerator includes the foregoing air distribution mechanism, the air distribution valve seat of the air distribution mechanism is eccentrically fixed on the cover by the valve body positioning pin, and a spring is embedded on a side of an end, facing away from the air distribution valve main body, of the air distribution valve seat; and the rotary valve of the air distribution mechanism is positioned in the cover by the bearing.

Compared within the related art, the present invention has the following advantages:

In the present invention, an air distribution valve main body and an air distribution valve seat are assembled to form an air distribution valve. The air distribution valve main body is made of a resin material. Hardness of the material used for making the air distribution valve seat is higher than that of the resin material, and hardness of the material used for making the rotary valve is also higher than that of the resin material. In addition, the air distribution valve main body has a lubricated air distribution plane, thereby avoiding performing surface treatment on the rotary valve to reduce costs, and only the rotary valve in the air distribution mechanism is a moving component. No new moving component is introduced in the air distribution mechanism. The air distribution mechanism is mounted in a cryogenic refrigerator, to ensure the device stability.

BRIEF DESCRIPTION OF THE DRAWINGS

FIG. 7 is a detailed schematic structural diagram of a rotary valve in an air distribution mechanism according to the present invention, where 1: Compressor; 1*a*: High-pressure air exhaust pipe; 1*b*: Low-pressure suction pipe; 2: Cover; 21: Cover air hole; 22: low-pressure passage; 3: Cam; 31: Eccentric cam handle; 4: Guiding sleeve; 5: Connecting rod; 6: Air distribution valve; 6*a*: Air distribution valve main body; 6*a*1: High-pressure passage; 6*a*2: Air distribution passage; 6*a*3: Air distribution plane; 6*a*4: Main body rear face; 6*a*5: Main body pin hole; 6*a*6: Main body outer diameter surface; 6*b*: Air distribution valve seat; 6*b*1: Valve seat high-pressure passage; 6*b*2: Valve seat air distribution passage; 6*b*3: Valve seat rear face; 6*b*4: Valve seat front face; 6*b*5: Valve seat pin hole; 6*b*7: Valve seat outer diameter surface; 6*b*8: Positive sealing groove; 6*c*: Intra-valve positioning pin; 62: High-pressure air hole; 63: Air distribution valve air hole; 66: Rear face; 7: Rotary valve; 71: Low-pressure hole; 72: High-pressure groove; 73: Switching plane; 8: Hot chamber; 9: Expansion chamber; 10*a*: Piston front hole; 10*b*: Piston rear hole; 10*c*: Cold storage material; 12: Motor; 13: Cylinder; 14: Bearing; 15: Spring; 16: Valve body positioning pin; b1: First sealing ring; b2: Second sealing ring; b3: Third sealing ring; b4: Fourth sealing ring; Y: Accommodating chamber; Y1: Lateral sealing groove; Y2: Accommodating chamber edge.

DETAILED DESCRIPTION

The present invention is further described below with reference to the accompanying drawings and embodiments.

As shown in FIG. 2 to FIG. 7, an air distribution mechanism includes an air distribution valve 6 including an air distribution side flow path and a rotary valve 7 including a switching side flow path, the air distribution valve 6 includes an air distribution valve main body 6*a* and an air distribution valve seat 6*b* that are fixedly connected and that are dismountable, the air distribution valve main body 6*a* and the air distribution valve seat 6*b* are eccentrically and fixedly connected together by an intra-valve positioning pin 6*c*, the air distribution valve main body 6*a* is provided with a main body pin hole 6*a*5 into which one end of the intra-valve positioning pin 6*c* is inserted, and the air distribution valve seat 6*b* is provided with a valve seat pin hole 6*b*5 into which the other end of the intra-valve positioning pin 6*c* is inserted; an air distribution plane 6*a*3 that is on the air distribution valve main body 6*a* and faces away from the air distribution valve seat 6*b* protrudes relative to the air distribution valve seat 6*b*, the air distribution plane 6*a*3 is tightly attached to a switching plane 73 on the rotary valve 7, and the switching plane 73 protrudes from the rotary valve 7; the air distribution valve 6 is fixedly mounted in a mounting chamber of the cover 2, the air distribution valve main body 6*a*, the air distribution valve seat 6*b* and the rotary valve 7 are coaxially arranged in the axial direction of the principal rotation axis O and are each dismountable in the axial direction of the principal rotation axis O, the air distribution valve 6 including the air distribution valve main body 6*a* and the air distribution valve seat 6*b* is stationary relative to the cover 2, and the rotary valve 7 is rotatable around a principal rotation axis O of the rotary valve relative to the air distribution valve 6 to switch connection states of the air distribution side flow path of the air distribution valve 6 and the switching side flow path of the rotary valve 7. That is, neither the air distribution valve main body 6*a* nor the air distribution valve seat 6*b* can circularly move around the principal rotation axis O. Only one component, that is, the rotary valve 7, rotates around the principal rotation axis O.

Figure 2:
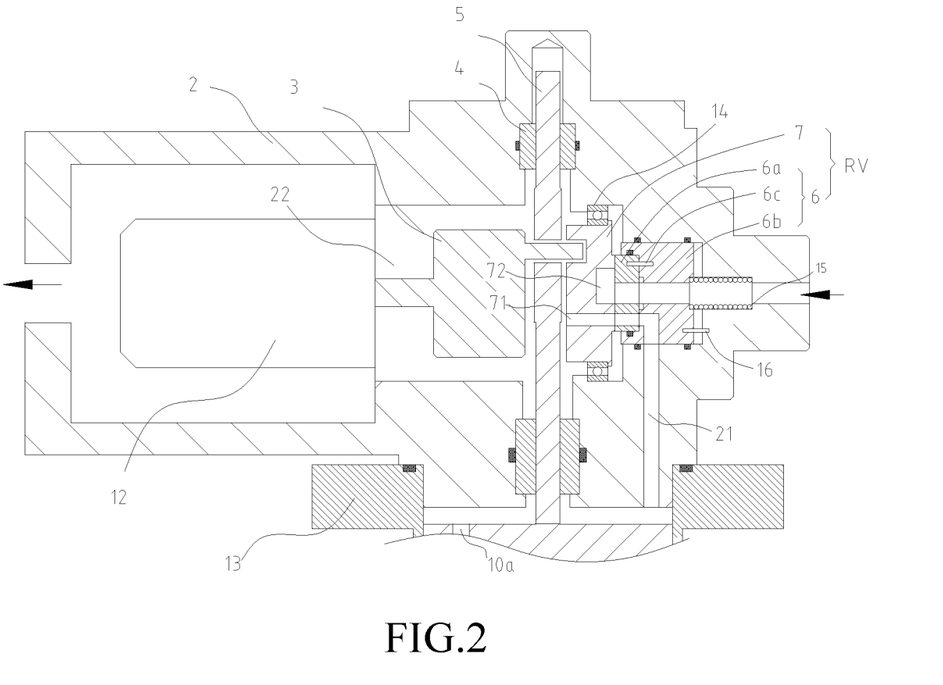
FIG. 2 is a schematic diagram of an assembly mechanism of an air distribution mechanism mounted in a cover according to the present invention.
Figure 3:
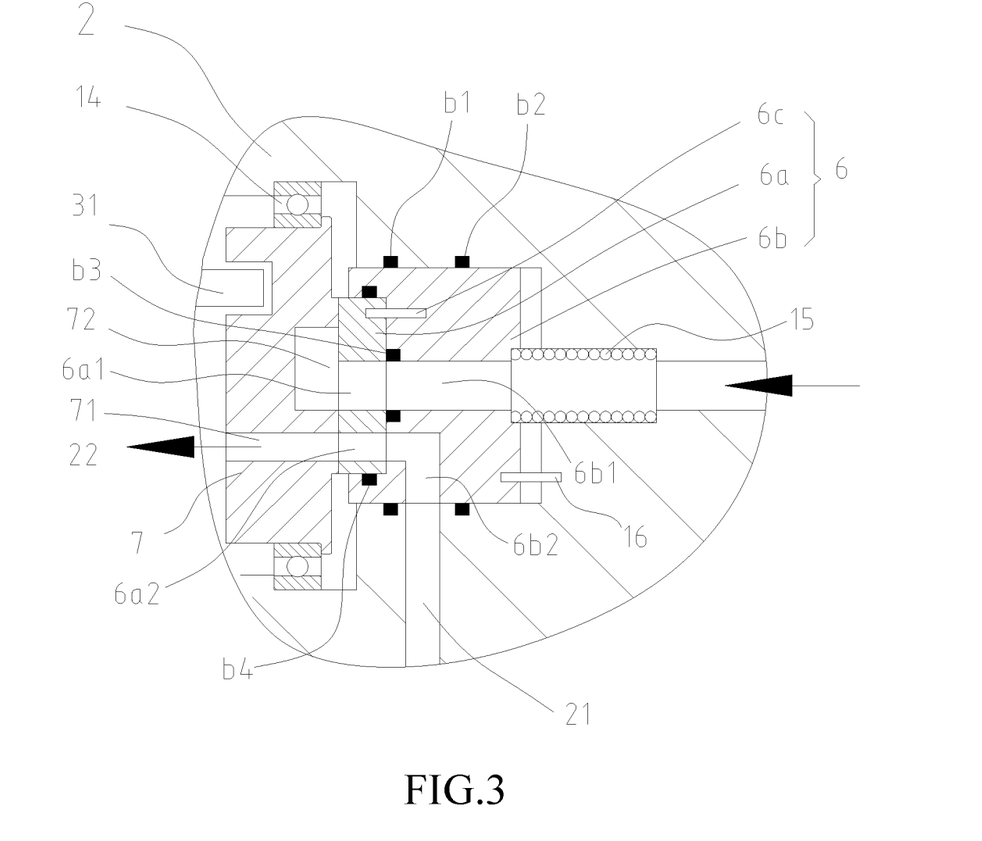
FIG. 3 is a schematic structural diagram of an air distribution mechanism when a low-pressure air path is in a communication state according to the present invention.
Figure 5:
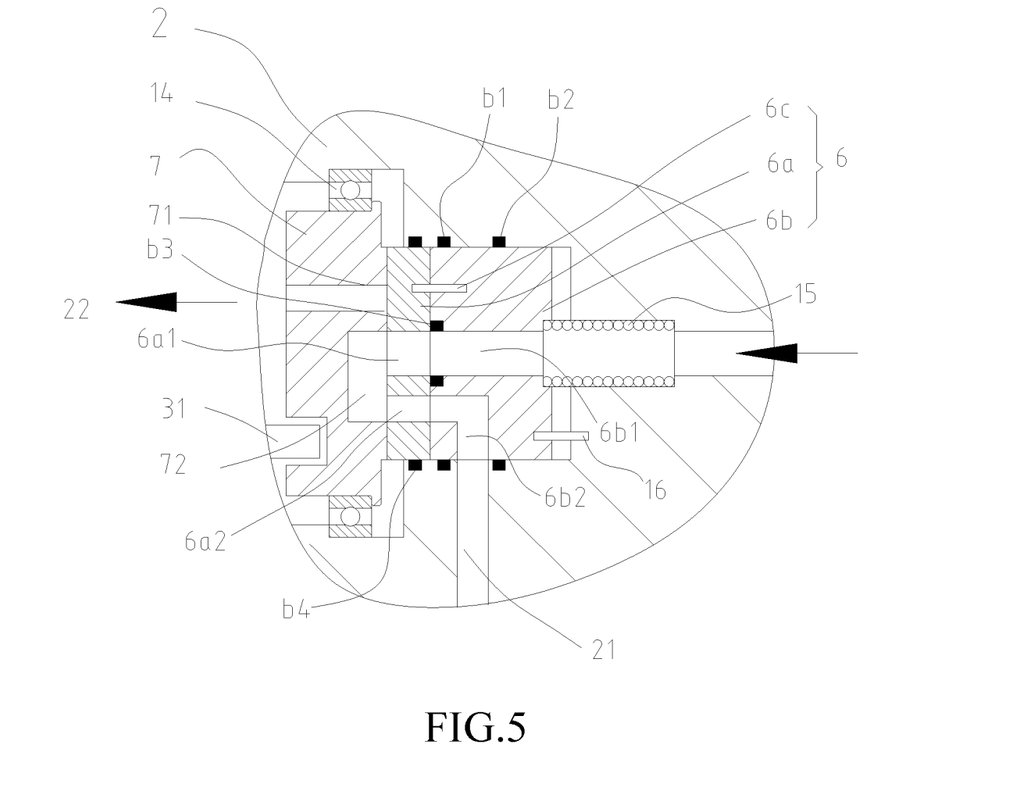
FIG. 5 is a schematic structural diagram of an air distribution mechanism when a high-pressure air path is in a communication state according to the present invention.

As shown in FIG. 2, FIG. 3 and FIG. 5, in reliance on a high-pressure gas in communication with a high-pressure air exhaust pipe 1*a* of a compressor 1, a positive pressure (in an arrow direction on a side of a spring shown in FIG. 3) that is in the axial direction of the principal rotation axis O and toward the rotary valve 7 is formed on the valve seat rear face 6*b*3 of the air distribution valve seat 6*b*. Because the rotary valve 7 is designed to be mounted on a bearing 14, the rotary valve 7 does not axially move to a low-pressure flow direction (an arrow direction on a side of the rotary valve shown in FIG. 3) along the axial direction of the principal rotation axis O Therefore, the valve seat rear face 6*b*3 of the air distribution valve seat 6*b* is subject to a positive pressure that is of a high-pressure gas discharged from the high-pressure air exhaust pipe 1*a* and that is in the axial direction of the principal rotation axis O and toward the rotary valve 7, so that the air distribution plane 6*a*3 on the air distribution valve main body 6*a* is tightly attached to the switching plane 73 on the rotary valve 7, and further a main body rear face 6*a*4 on the air distribution valve main body 6*a* is tightly attached to a valve seat front face 6*b*4 on the air distribution valve seat 6*b*.

As shown in FIG. 2 to FIG. 7, specifically, a high-pressure passage 6*a*1 and an air distribution passage 6*a*2 running through the air distribution valve main body 6*a* in the axial direction are disposed on the air distribution valve main body 6*a*, and a valve seat high-pressure passage 6*b*1 running through the air distribution valve seat 6*b* in the axial direction, and a valve seat air distribution passage 6*b*2 running through the air distribution valve seat 6*b* in a folded direction are disposed on the air distribution valve seat 6*b*; and the high-pressure passage 6*a*1 and the valve seat high-pressure passage 6*b*1 are arranged in communication with each other and are capable of being in communication with a high-pressure air exhaust pipe 1*a* of the compressor 1. Further, the high-pressure passage 6*a*1 and the valve seat high-pressure passage 6*b*1 are kept in airtight communication by a third sealing ring b3 that is disposed in a communication place of the high-pressure passage and the valve seat high-pressure passage and that is located on a side of the valve seat high-pressure passage 6b1. The third sealing ring b3 is embedded in a positive sealing groove 6b8 disposed at an end of an inner chamber of the valve seat high-pressure passage 6b1. The air distribution passage 6a2 and the valve seat air distribution passage 6b2 are arranged in communication with each other and are capable of being in communication with a cover air hole 21 on the cover 2. Further, the valve seat air distribution passage 6b2 and the air distribution passage 6a2 are kept in airtight communication through a combination of the third sealing ring b3 and a fourth sealing ring b4. Based on this, the high-pressure passage 6a1 and the valve seat high-pressure passage 6b1 are capable of being in communication with the air distribution passage 6a2, the valve seat air distribution passage 6b2, and the cover air hole 21 through a high-pressure groove 72 on the rotary valve 7 (as shown in FIG. 5); or the valve seat air distribution passage 6b2 and the air distribution passage 6a2 are in communication with a low-pressure passage 22 on the cover 2 through a low-pressure hole 71 running through the rotary valve 7 (as shown in FIG. 3).

In addition, as shown in FIG. 3 and FIG. 5, the air distribution valve seat 6b is mounted in the cover 2. A first sealing ring b1 and a second sealing ring b2 embedded in an inner wall of the mounting chamber of the cover 2 are disposed on a valve seat outer diameter surface 6b7 of the air distribution valve seat 6b, to laterally seal the air distribution valve seat 6b, and implement the airtight communication between the valve seat air distribution passage 6b2 and the cover air hole 21. Therefore, the high-pressure passage 6a1 is in airtight communication with the valve seat high-pressure passage 6b1, and is in airtight communication with the high-pressure air exhaust pipe 1a of the compressor 1. The air distribution passage 6a2 and the valve seat air distribution passage 6b2 are in communication with each other and are in airtight communication with a gas in the cylinder 13. An internal pressure is determined through the rotation switching of the rotary valve 7.

To implement the coaxial arrangement of the air distribution valve main body 6a and the air distribution valve seat 6b, there are two implementations.

Figure 4:
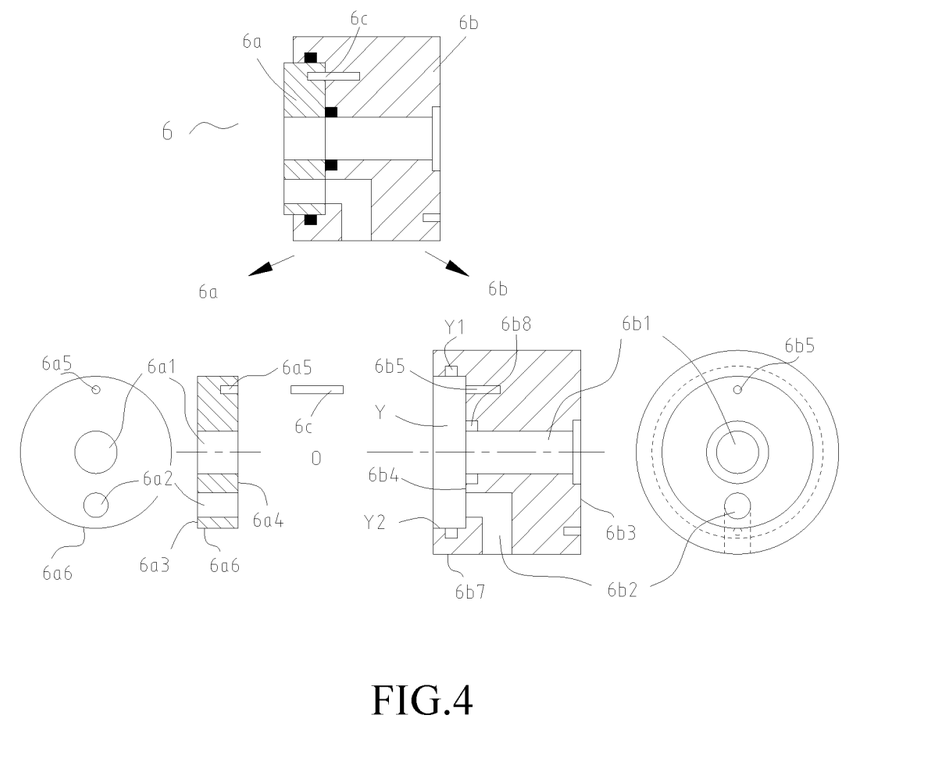
FIG. 4 is a detailed schematic structural diagram of an air distribution valve in FIG. 3.

A first implementation is shown in FIG. 3 and FIG. 4. The air distribution valve seat 6b is provided with an accommodating chamber Y in which the air distribution valve main body 6a is capable of being embedded, a radial length of an accommodating chamber edge Y2 of the accommodating chamber Y is consistent with a radial length of a main body outer diameter surface 6a6 of the air distribution valve main body 6a, and an inner wall of the accommodating chamber Y is provided with a lateral sealing groove Y1 in which the fourth sealing ring b4 is disposed; and a first sealing ring b1 and a second sealing ring b2 embedded in an inner wall of the mounting chamber of the cover 2 are disposed on a valve seat outer diameter surface 6b7 of the air distribution valve seat 6b, to laterally seal the air distribution valve seat 6b.

Figure 6:
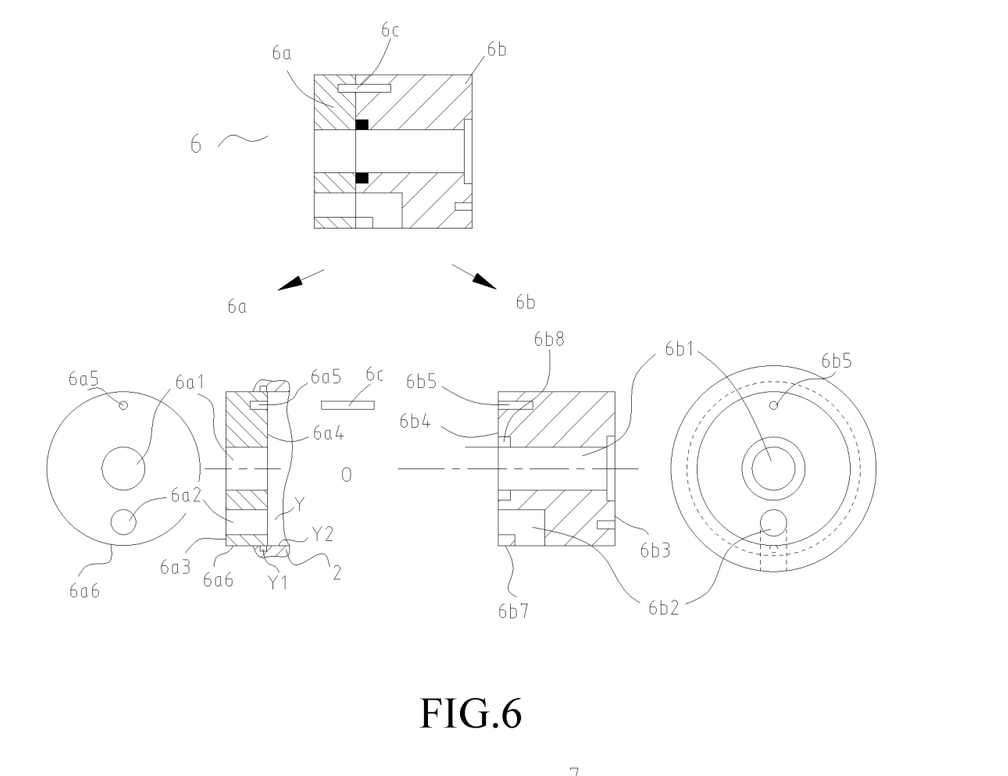
FIG. 6 is a detailed schematic structural diagram of an air distribution valve in FIG. 5.
Figure 7:
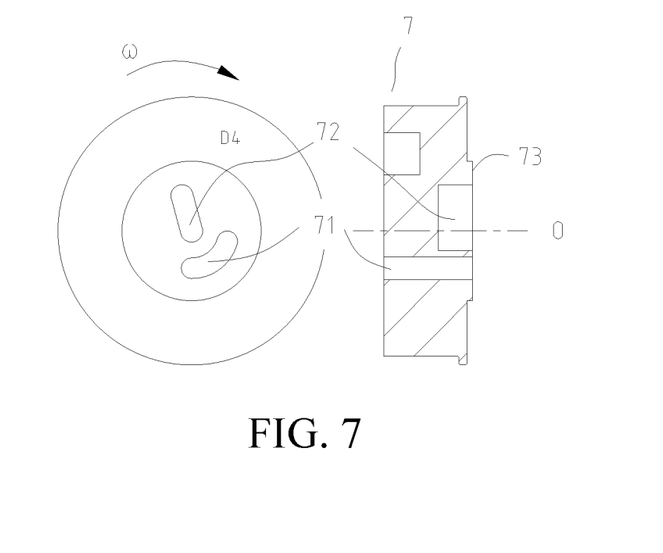

A second implementation is shown in FIG. 5 and FIG. 6. A radial size of a main body outer diameter surface 6a6 of the air distribution valve main body 6a is consistent with a radial size of a valve seat outer diameter surface 6b7 of the air distribution valve seat 6b, the air distribution valve main body 6a and the air distribution valve seat 6b are both mounted in the cover 2, and an inner wall of an accommodating chamber Y of the cover 2 is provided with a lateral sealing groove Y1 in which the fourth sealing ring b4 is disposed; and a first sealing ring b1 and a second sealing ring b2 embedded in the inner wall of the accommodating chamber Y of the cover 2 are disposed on the valve seat outer diameter surface 6b7 of the air distribution valve seat 6b, to laterally seal the air distribution valve seat 6b.

According to the foregoing implementations, material hardness of the air distribution valve main body 6a is lower than material hardness of the rotary valve 7. For example, the air distribution valve main body 6a is made of a resin material, and the rotary valve 7 and the air distribution valve seat 6b may be made of stainless steel or other metal materials. Therefore, no surface treatment needs to be performed on the rotary valve 7, provided that the rotary valve is made of a more wear-resistant metal, to save high manufacturing costs. In addition, there is still only one moving component, that is, the rotary valve 7, in an operation process of the air distribution mechanism. Therefore, compared with a conventional air distribution mechanism, no more moving component is added, thereby keeping the stability of a long-term operation of a device.

A cryogenic refrigerator using the foregoing air distribution mechanism is provided. The cryogenic refrigerator includes the foregoing air distribution mechanism, the air distribution valve seat 6b of the air distribution mechanism is eccentrically fixed on the cover 2 by the valve body positioning pin 16, and a spring 15 is embedded on a side of an end, facing away from the air distribution valve main body 6a, of the air distribution valve seat 6b; and the rotary valve 7 of the air distribution mechanism is positioned in the cover 2 by the bearing 14. The cryogenic refrigerator is any type of valve-switching refrigerator, and is not limited to a GM refrigerator, a Solvay refrigerator, a pulse pipe refrigerator, or the like.

In the present invention, an air distribution valve main body 6a and an air distribution valve seat 6b are assembled to form an air distribution valve 6. The air distribution valve main body 6a is made of a resin material. Hardness of the material used for making the air distribution valve seat 6b is higher than that of the resin material, and hardness of the material used for making the rotary valve 7 is also higher than that of the resin material. In addition, the air distribution valve main body 6a has a lubricated air distribution plane 6a3, thereby avoiding performing surface treatment on the rotary valve 7 to reduce costs, and only the rotary valve 7 in the air distribution mechanism is a moving component. No new moving component is introduced in the air distribution mechanism. The air distribution mechanism is mounted in a cryogenic refrigerator, to ensure the device stability.

The foregoing embodiments are only used for explaining the technical idea of the present invention, and are not intended to limit the protection scope of the present invention. Any changes made based on the technical solution and according to the technical idea proposed by the present invention shall fall within the protection scope of the present invention. The technologies not involved in the present invention can be implemented by the existing technologies.

What is claimed is:

1. An air distribution mechanism, comprising an air distribution valve (6) comprising an air distribution side flow path and a rotary valve (7) comprising a switching side flow path, wherein the air distribution valve (6) comprises an air distribution valve main body (6a) and an air distribution valve seat (6b) that are fixedly connected and that are dismountable, an air distribution plane (6a3) that is on the air distribution valve main body (6a) and faces away from the air distribution valve seat (6b) protrudes relative to the air distribution valve seat (6b), the air distribution plane (6a3) is brought into contact with a switching plane (73) on the rotary valve (7), and the switching plane (73) protrudes from the rotary valve (7); the air distribution valve (6) is fixedly mounted in a mounting chamber of the cover (2), and the rotary valve (7) is rotatable around a principal rotation axis O of the rotary valve relative to the air distribution valve (6) to switch connection states of the air distribution side flow path of the air distribution valve (6) and the switching side flow path of the rotary valve (7); the air distribution valve main body (6a) and the air distribution valve seat (6b) are eccentrically and fixedly connected together by an intra-valve positioning pin (6c), the air distribution valve main body (6a) is provided with a main body pin hole (6a5) into which one end of the intra-valve positioning pin (6c) is inserted, and the air distribution valve seat (6b) is provided with a valve seat pin hole (6b5) into which the other end of the intra-valve positioning pin (6c) is inserted; and material hardness of the air distribution valve main body (6a) is lower than material hardness of the rotary valve (7).

2. The air distribution mechanism according to claim 1, wherein the air distribution valve main body (6a), the air distribution valve seat (6b) and the rotary valve (7) are coaxially arranged in an axial direction of the principal rotation axis O and are each dismountable in the axial direction of the principal rotation axis O, and the air distribution valve (6) comprising the air distribution valve main body (6a) and the air distribution valve seat (6b) is stationary relative to the cover (2).

3. The air distribution mechanism according to claim 1, wherein a high-pressure passage (6a1) and an air distribution passage (6a2) running through the air distribution valve main body (6a) in the axial direction are disposed on the air distribution valve main body (6a), and a valve seat high-pressure passage (6b1) running through the air distribution valve seat (6b) in the axial direction, and a valve seat air distribution passage (6b2) running through the air distribution valve seat (6b) in a folded direction are disposed on the air distribution valve seat (6b); the high-pressure passage (6a1) and the valve seat high-pressure passage (6b1) are arranged in communication with each other and are capable of being in communication with a high-pressure air exhaust pipe (1a) of a compressor (1); and the air distribution passage (6a2) and the valve seat air distribution passage (6b2) are arranged in communication with each other and are capable of being in communication with an cover air hole (21) on the cover (2).

4. The air distribution mechanism according to claim 3, wherein the high-pressure passage (6a1) and the valve seat high-pressure passage (6b1) are capable of being in communication with the air distribution passage (6a2), the valve seat air distribution passage (6b2), and the cover air hole (21) through a high-pressure groove (72) on the rotary valve (7); or the valve seat air distribution passage (6b2) and the air distribution passage (6a2) are in communication with a low-pressure passage (22) on the cover (2) through a low-pressure hole (71) running through the rotary valve (7).

5. The air distribution mechanism according to claim 3, wherein the high-pressure passage (6a1) and the valve seat high-pressure passage (6b1) are kept in airtight communication by a sealing ring (b3) that is disposed in a communication place of the high-pressure passage and the valve seat high-pressure passage and that is located on a side of the valve seat high-pressure passage (6b1); and the valve seat air distribution passage (6b2) and the air distribution passage (6a2) are kept in airtight communication through a combination of the sealing ring (b3) and another sealing ring (b4).

6. The air distribution mechanism according to claim 5, wherein the sealing ring (b3) is embedded in a positive sealing groove (6b8) disposed at an end of an inner chamber of the valve seat high-pressure passage (6b1).

7. The air distribution mechanism according to claim 1, wherein a valve seat rear face (6b3) of the air distribution valve seat (6b) is subject to a positive pressure that is of a high-pressure gas discharged from the high-pressure air exhaust pipe (1a) and that is in the axial direction of the principal rotation axis O and toward the rotary valve (7), so that the air distribution plane (6a3) on the air distribution valve main body (6a) is attached to the switching plane (73) on the rotary valve (7), and further a main body rear face (6a4) on the air distribution valve main body (6a) is attached to a valve seat front face (6b4) on the air distribution valve seat (6b).

8. The air distribution mechanism according to claim 1, wherein the air distribution valve seat (6b) is provided with an accommodating chamber (Y) in which the air distribution valve main body (6a) is capable of being embedded, a radial length of an accommodating chamber edge (Y2) of the accommodating chamber (Y) is consistent with a radial length of a main body outer diameter surface (6a6) of the air distribution valve main body (6a), and an inner wall of the accommodating chamber (Y) is provided with a lateral sealing groove (Y1); and a first sealing ring (b1) and a second sealing ring (b2) embedded in an inner wall of the mounting chamber of the cover (2) are disposed on a valve seat outer diameter surface (6b7) of the air distribution valve seat (6b), to laterally seal the air distribution valve seat (6b).

9. The air distribution mechanism according to claim 1, wherein a radial size of a main body outer diameter surface (6a6) of the air distribution valve main body (6a) is consistent with a radial size of a valve seat outer diameter surface (6b7) of the air distribution valve seat (6b), the air distribution valve main body (6a) and the air distribution valve seat (6b) are both mounted in the cover (2), and an inner wall of an accommodating chamber (Y) of the cover (2) is provided with a lateral sealing groove (Y1); and a first sealing ring (b1) and a second sealing ring (b2) embedded in the inner wall of the accommodating chamber (Y) of the cover (2) are disposed on the valve seat outer diameter surface (6b7) of the air distribution valve seat (6b), to laterally seal the air distribution valve seat (6b).

10. A cryogenic refrigerator using the air distribution mechanism according to claim 1, wherein the cryogenic refrigerator comprises the foregoing air distribution mechanism, the air distribution valve seat (6b) of the air distribution mechanism is eccentrically fixed on the cover (2) by the valve body positioning pin (16), and a spring (15) is embedded on a side of an end, facing away from the air distribution valve main body (6a), of the air distribution valve seat (6b); and the rotary valve (7) of the air distribution mechanism is positioned in the cover (2) by the bearing (14).

11. The air distribution mechanism according to claim 2, wherein the air distribution valve seat (6b) is provided with an accommodating chamber (Y) in which the air distribution valve main body (6a) is capable of being embedded, a radial length of an accommodating chamber edge (Y2) of the accommodating chamber (Y) is consistent with a radial length of a main body outer diameter surface (6a6) of the air distribution valve main body (6a), and an inner wall of the accommodating chamber (Y) is provided with a lateral sealing groove (Y1); and a first sealing ring (b1) and a second sealing ring (b2) embedded in an inner wall of the mounting chamber of the cover (2) are disposed on a valve seat outer diameter surface (6b7) of the air distribution valve seat (6b), to laterally seal the air distribution valve seat (6b).

12. The air distribution mechanism according to claim 3, wherein the air distribution valve seat (6b) is provided with an accommodating chamber (Y) in which the air distribution valve main body (6*a*) is capable of being embedded, a radial length of an accommodating chamber edge (Y2) of the accommodating chamber (Y) is consistent with a radial length of a main body outer diameter surface (6*a*6) of the air distribution valve main body (6*a*), and an inner wall of the accommodating chamber (Y) is provided with a lateral sealing groove (Y1); and a first sealing ring (b1) and a second sealing ring (b2) embedded in an inner wall of the mounting chamber of the cover (2) are disposed on a valve seat outer diameter surface (6*b*7) of the air distribution valve seat (6*b*), to laterally seal the air distribution valve seat (6*b*).

13. The air distribution mechanism according to claim 4, wherein the air distribution valve seat (6*b*) is provided with an accommodating chamber (Y) in which the air distribution valve main body (6*a*) is capable of being embedded, a radial length of an accommodating chamber edge (Y2) of the accommodating chamber (Y) is consistent with a radial length of a main body outer diameter surface (6*a*6) of the air distribution valve main body (6*a*), and an inner wall of the accommodating chamber (Y) is provided with a lateral sealing groove (Y1); and a first sealing ring (b1) and a second sealing ring (b2) embedded in an inner wall of the mounting chamber of the cover (2) are disposed on a valve seat outer diameter surface (6*b*7) of the air distribution valve seat (6*b*), to laterally seal the air distribution valve seat (6*b*).

14. The air distribution mechanism according to claim 5, wherein the air distribution valve seat (6*b*) is provided with an accommodating chamber (Y) in which the air distribution valve main body (6*a*) is capable of being embedded, a radial length of an accommodating chamber edge (Y2) of the accommodating chamber (Y) is consistent with a radial length of a main body outer diameter surface (6*a*6) of the air distribution valve main body (6*a*), and an inner wall of the accommodating chamber (Y) is provided with a lateral sealing groove (Y1); and a first sealing ring (b1) and a second sealing ring (b2) embedded in an inner wall of the mounting chamber of the cover (2) are disposed on a valve seat outer diameter surface (6*b*7) of the air distribution valve seat (6*b*), to laterally seal the air distribution valve seat (6*b*).

15. The air distribution mechanism according to claim 2, wherein a radial size of a main body outer diameter surface (6*a*6) of the air distribution valve main body (6*a*) is consistent with a radial size of a valve seat outer diameter surface (6*b*7) of the air distribution valve seat (6*b*), the air distribution valve main body (6*a*) and the air distribution valve seat (6*b*) are both mounted in the cover (2), and an inner wall of an accommodating chamber (Y) of the cover (2) is provided with a lateral sealing groove (Y1); and a first sealing ring (b1) and a second sealing ring (b2) embedded in the inner wall of the accommodating chamber (Y) of the cover (2) are disposed on the valve seat outer diameter surface (6*b*7) of the air distribution valve seat (6*b*), to laterally seal the air distribution valve seat (6*b*).

16. The air distribution mechanism according to claim 3, wherein a radial size of a main body outer diameter surface (6*a*6) of the air distribution valve main body (6*a*) is consistent with a radial size of a valve seat outer diameter surface (6*b*7) of the air distribution valve seat (6*b*), the air distribution valve main body (6*a*) and the air distribution valve seat (6*b*) are both mounted in the cover (2), and an inner wall of an accommodating chamber (Y) of the cover (2) is provided with a lateral sealing groove (Y1); and a first sealing ring (b1) and a second sealing ring (b2) embedded in the inner wall of the accommodating chamber (Y) of the cover (2) are disposed on the valve seat outer diameter surface (6*b*7) of the air distribution valve seat (6*b*), to laterally seal the air distribution valve seat (6*b*).

17. The air distribution mechanism according to claim 4, wherein a radial size of a main body outer diameter surface (6*a*6) of the air distribution valve main body (6*a*) is consistent with a radial size of a valve seat outer diameter surface (6*b*7) of the air distribution valve seat (6*b*), the air distribution valve main body (6*a*) and the air distribution valve seat (6*b*) are both mounted in the cover (2), and an inner wall of an accommodating chamber (Y) of the cover (2) is provided with a lateral sealing groove (Y1); and a first sealing ring (b1) and a second sealing ring (b2) embedded in the inner wall of the accommodating chamber (Y) of the cover (2) are disposed on the valve seat outer diameter surface (6*b*7) of the air distribution valve seat (6*b*), to laterally seal the air distribution valve seat (6*b*).

18. The air distribution mechanism according to claim 5, wherein a radial size of a main body outer diameter surface (6*a*6) of the air distribution valve main body (6*a*) is consistent with a radial size of a valve seat outer diameter surface (6*b*7) of the air distribution valve seat (6*b*), the air distribution valve main body (6*a*) and the air distribution valve seat (6*b*) are both mounted in the cover (2), and an inner wall of an accommodating chamber (Y) of the cover (2) is provided with a lateral sealing groove (Y1); and a first sealing ring (b1) and a second sealing ring (b2) embedded in the inner wall of the accommodating chamber (Y) of the cover (2) are disposed on the valve seat outer diameter surface (6*b*7) of the air distribution valve seat (6*b*), to laterally seal the air distribution valve seat (6*b*).

19. A cryogenic refrigerator using the air distribution mechanism according to claim 14, wherein the cryogenic refrigerator comprises the foregoing air distribution mechanism, the air distribution valve seat (6*b*) of the air distribution mechanism is eccentrically fixed on the cover (2) by the valve body positioning pin (16), and a spring (15) is embedded on a side of an end, facing away from the air distribution valve main body (6*a*), of the air distribution valve seat (6*b*); and the rotary valve (7) of the air distribution mechanism is positioned in the cover (2) by the bearing (14).

20. A cryogenic refrigerator using the air distribution mechanism according to claim 19, wherein the cryogenic refrigerator comprises the foregoing air distribution mechanism, the air distribution valve seat (6*b*) of the air distribution mechanism is eccentrically fixed on the cover (2) by the valve body positioning pin (16), and a spring (15) is embedded on a side of an end, facing away from the air distribution valve main body (6*a*), of the air distribution valve seat (6*b*); and the rotary valve (7) of the air distribution mechanism is positioned in the cover (2) by the bearing (14).

\* \* \* \* \*